United States Patent
Goldman et al.

(10) Patent No.: US 11,801,747 B1
(45) Date of Patent: Oct. 31, 2023

(54) ELECTRICAL MOTOR TRANSMISSION

(71) Applicants: Alon Goldman, Netanya (IL); Michael Nenner Weil, Tel-Aviv (IL)

(72) Inventors: Alon Goldman, Netanya (IL); Michael Nenner Weil, Tel-Aviv (IL)

(*) Notice: Subject to any disclaimer, the term of this patent is extended or adjusted under 35 U.S.C. 154(b) by 0 days.

(21) Appl. No.: 17/835,995

(22) Filed: Jun. 9, 2022

(51) Int. Cl.
*B60K 17/14* (2006.01)
*H02K 7/00* (2006.01)
*B60K 17/26* (2006.01)
*B60K 17/02* (2006.01)
*B60K 17/16* (2006.01)
*H02K 7/116* (2006.01)
*F16H 3/00* (2006.01)
*F16H 3/54* (2006.01)

(52) U.S. Cl.
CPC ............ *B60K 17/145* (2013.01); *B60K 17/02* (2013.01); *B60K 17/16* (2013.01); *B60K 17/26* (2013.01); *F16H 3/005* (2013.01); *H02K 7/006* (2013.01); *H02K 7/116* (2013.01); *F16H 3/54* (2013.01)

(58) Field of Classification Search
CPC ...... B60K 17/145; B60K 17/02; B60K 17/16; B60K 17/26; B60K 17/04; B60K 17/043; B60K 17/046; H02K 7/006; H02K 7/116; F16H 3/005; F16H 3/54; F16H 3/44; F16H 3/48; F16H 3/52; F16H 3/003; F16H 2200/2005; F16H 2200/2033; F16H 2200/2066; F16H 2200/2082; B62M 11/14–16
See application file for complete search history.

(56) References Cited

U.S. PATENT DOCUMENTS

| | | | |
|---|---|---|---|
| 2014/0106930 A1* | 4/2014 | Smetana | B60K 1/00 477/35 |
| 2014/0256493 A1* | 9/2014 | Knoblauch | B60K 17/046 475/151 |
| 2014/0311284 A1* | 10/2014 | Chen | B60K 6/547 903/902 |
| 2015/0203106 A1* | 7/2015 | Zhao | B60L 15/2009 701/22 |
| 2019/0291716 A1* | 9/2019 | Kasahara | B60W 10/02 |
| 2020/0278011 A1* | 9/2020 | Torii | F16D 49/08 |
| 2021/0070280 A1* | 3/2021 | Genise | B60K 6/40 |
| 2021/0291646 A1* | 9/2021 | Lorenz | B60K 17/02 |
| 2022/0177074 A1* | 6/2022 | Li | B62M 25/04 |

* cited by examiner

*Primary Examiner* — Timothy Hannon
*Assistant Examiner* — Farhana Pervin
(74) *Attorney, Agent, or Firm* — Sorker Agmon Nordman Riba

(57) ABSTRACT

Provided is a powertrain of a vehicle comprising an electric motor, a final drive, a gearing system with two-degrees-of-freedom configured to transfer power from the electric motor to the final drive, the gearing system comprising a one-way mechanism, and a mechanical friction brake connected to the gearing system. The powertrain further comprises a control system. The powertrain enables power driving, coasting without motor drag and braking with regenerative braking. Further provided is a method for controlling braking mode in a vehicle that comprises such a powertrain.

16 Claims, 12 Drawing Sheets

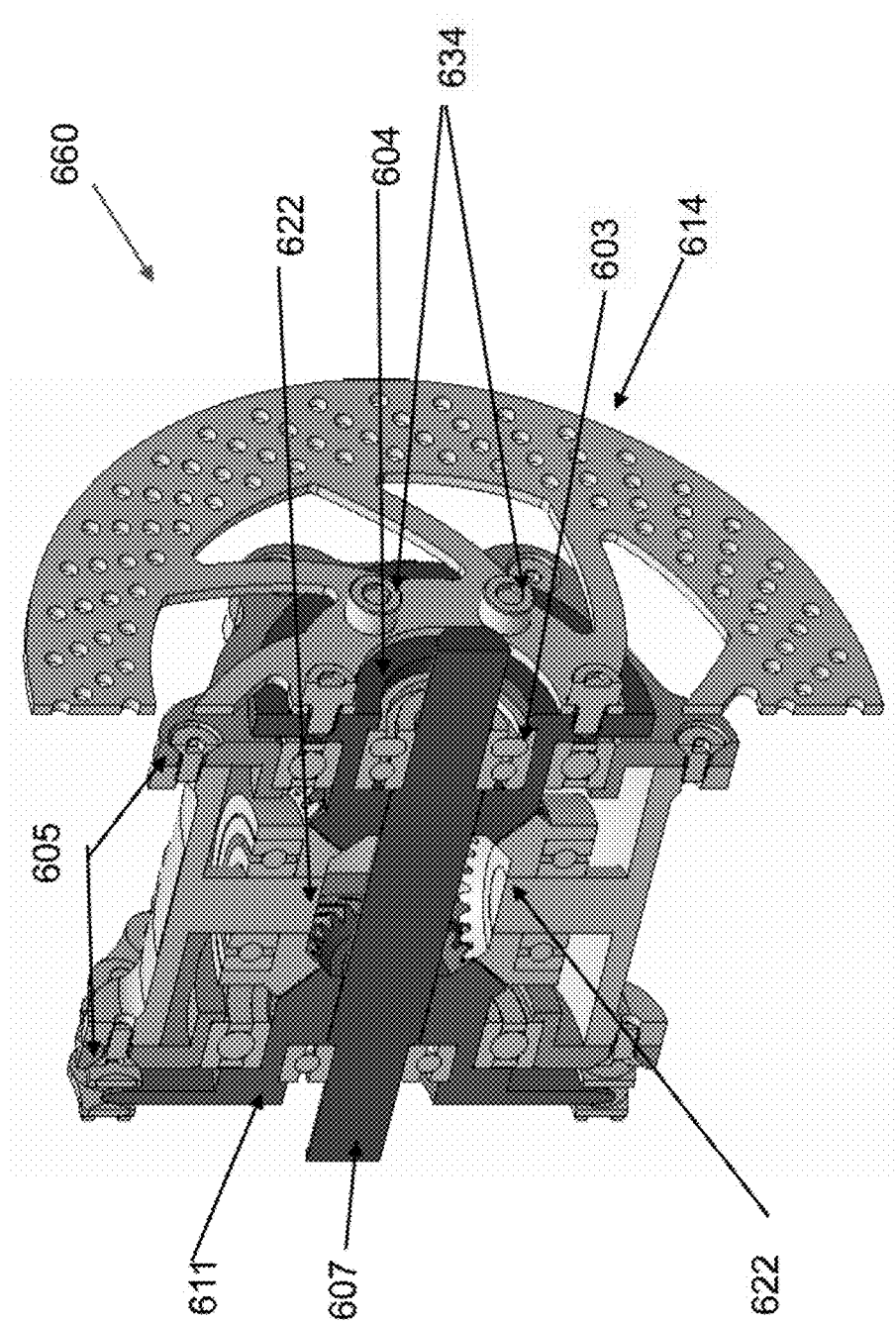

Alternative configurations

| | Topology | Motor | Final Drive | One-way | Braked component | Control parameters |
|---|---|---|---|---|---|---|
| A | Planetary<br>$(R + S) \times Tc = R \times Tr + S \times Ts$ | Sun<br>$Ts$ | Ring<br>$Tr$ | Planet Carrier Vs Chassis<br>$Tc \leq 0$ | Planet Carrier<br>$Tc \to 0$ | $Gear = -R/S$<br>$0 < Regen < 1$ |
| B | Differential<br>$Trc = (T1 + T2)/2$ | First side gear<br>$T1$ | Rack Carrier<br>$Trc$ | Second side gear Vs Chassis<br>$T2 \leq 0$ | Second side gear<br>$T2 \to 0$ | $Gear = 2$<br>$0 < Regen < 1$ |
| C Dual Ratio | Planetary<br>$(R + S) \times Tc = R \times Tr + S \times Ts$ | Sun<br>$Ts$ | Ring<br>$Tr$ | Planet carrier Vs Sun<br>$Tc \leq Ts$ | Planet Carrier<br>$Tc \to 0$ | $Gear = -R/S$<br>$0 < Regen < 1$ |
| D Semi Regenerative | Differential<br>$Trc = (T1 + T2)/2$ | First side gear<br>$T1$ | Rack Carrier<br>$Trc$ | Rack Carrier Vs First side gear<br>$Trc \leq T1$ | Second side gear<br>$T2 \to 0$ | $Gear = 2$<br>$0 < Regen < 0.5$ |

FIG. 8

ELECTRICAL MOTOR TRANSMISSION

TECHNICAL FIELD

The present disclosure generally relates to an electrical motor transmission with two-degrees-of-freedom, and more specifically to an electrical motor gearing system with two-degrees-of-freedom arranged to enable coasting as well as regenerative braking.

BACKGROUND

Current electric vehicles use an electric motor implemented with a direct-drive connection to the final drive, or a 'one-way clutch' or 'unidirectional clutch' gearing system. Direct-drive, which is the common case for automobiles and motorcycles, natively allows for regenerative braking but with the disadvantage of always dragging the motor, thus preventing an efficient coasting mode, as the motor is constantly 'engaged' to the final-drive.

One-way clutch gearing connection, which is the common case for electric bicycles, enables coasting without dragging the motor but prohibits regenerative braking.

There is the need for a transmission that enables coasting with no motor dragging and the ability to convert kinetic energy to electric energy during the braking process, to thereby provide an energy efficient transmission for electric vehicles.

SUMMARY

The present disclosure provides a powertrain comprising a gearing system with two-degrees-of-freedom. The powertrains of the present disclosure, and more specifically the gearing systems of the present disclosure, are arranged in such a way that enables coasting as well as regenerative braking.

The present disclosure provides a powertrain of a vehicle comprising an electric motor, a final drive, a gearing system with two-degrees-of-freedom comprising at least three components configured to rotate one with respect to the other. The gearing system may be configured to transfer power from the electric motor to the final drive, wherein the gearing system comprises a one-way mechanism connected to one of the at least three rotating components of the gearing system, the one-way mechanism may be configured to reduce a degree of freedom of the two-degrees-of-freedom by restricting rotation of the one component along a first direction, during a powered driving mode of the powertrain, while said one-way mechanism may be configured to enable free rotation of the one component along a second opposite direction, during coasting mode of the powertrain, thereby avoiding drag of the electric motor. The powertrain may further comprise a mechanical friction brake connected to the gearing system via a component of the at least three components, said mechanical friction brake configured to reduce a degree of freedom of the two-degrees-of-freedom by restricting rotation of the component that the mechanical friction brake is connected to, to cause motion of the electric motor, during a braking mode of the powertrain, thereby regenerating energy by the electric motor.

Optionally, the mechanical friction brake is connected to the gearing system and is not connected to the final drive.

Optionally, the one-way mechanism is an overrunning clutch.

Optionally, the gearing system may comprise a planetary gear, and the at least three components may comprise a sun gear rotatably connected to the electric motor and to at least one planet gear, wherein the at least one planet gear is rotatably connected to a planet carrier.

Optionally, the one-way mechanism may be a one-way bearing incorporated as part of the planet carrier, the one-way bearing is configured to allow the planet carrier to rotate in a first direction and prevent the planet carrier to rotate in a second direction, said second direction being opposite the first direction.

Optionally, the mechanical friction brake is connected to the planet carrier, the mechanical friction brake may be configured to slow rotation of the planet carrier and thus mechanically force rotation of the electric motor via forced rotation of the sun, thereby enabling regenerative braking.

Optionally, the mechanical friction brake comprises a disc brake.

Optionally, the gearing system comprises a differential gear system, wherein the at least three components comprise a first side gear rotatably connected to the electric motor and to a horizontal planet gear, the horizontal planet gear is rotatably connected to a rack carrier, and wherein the horizontal planet gear is further rotatably connected to a second side gear.

Optionally, the one-way mechanism is a one-way bearing incorporated as part of the second side gear, the one-way bearing is configured to allow the second side gear to rotate in a first direction and prevent the second side gear to rotate in a second direction, the second direction being opposite the first direction.

Optionally, the mechanical friction brake comprises a disc brake connected to the second side gear, the disc brake is configured to slow rotation of the second side gear and thus mechanically force rotation of the electric motor via forced rotation of the first side gear, thereby enabling regenerative braking.

The present disclosure further provides a vehicle gearing system comprising: an electric motor, a final drive, and a gearing system with two-degrees-of-freedom comprising at least three components configured to rotate one with respect to the other, the gearing system configured to transfer power from the electric motor to the final drive. The gearing system comprises a one-way mechanism connected to one of the at least three rotating components of the gearing system, the one-way mechanism configured to reduce a degree of freedom of the two-degrees-of-freedom by restricting rotation of the one component along a first direction, during a powered driving mode of the powertrain, while the one-way mechanism is configured to enable free rotation of the one component along a second opposite direction, during coasting mode of the powertrain, thereby avoiding drag of the electric motor. The powertrain may further comprise a mechanical friction brake connected to the gearing system via a component of the at least three components, the mechanical friction brake configured to reduce a degree of freedom of the two-degrees-of-freedom by restricting rotation of the component that the mechanical friction brake is connected to, to cause motion of the electric motor, during a braking mode of the powertrain, thereby regenerating energy by the electric motor. The powertrain may further comprise a control system configured to control an amount of the power supplied by the electric motor during the driving mode, and to control an amount of negative torque applied by the electric motor during the regenerative braking mode. The control system comprising a processor configured to:
detect braking mode;

predefine a set point value based on: (i) transmission ratio of the vehicle and (ii) a parameter modifiable according to required regeneration ratio;

calculate a process value based on ratio between motor speed and final drive speed; and determine an amount of negative torque required for equality between the process value and the set point value, the negative torque to be applied by the electric motor during the regenerative braking mode.

Optionally, the required regeneration ratio is determined by at least one of: battery/capacitor state of charge (SOC), power ratings, driving speed, motor load, terrain, temperature, or any combination thereof.

The present disclosure may further comprise a method for controlling braking mode in a vehicle, the vehicle comprising an electric motor, a final drive, and a gearing system with two-degrees-of-freedom comprising at least three components configured to rotate one with respect to the other, the gearing system configured to transfer power from the electric motor to the final drive. The gearing system comprises a one-way mechanism connected to one of the at least three rotating components of the gearing system, the one-way mechanism configured to reduce a degree of freedom of the two-degrees-of-freedom by restricting rotation of the one component along a first direction, during a powered driving mode of the powertrain, while the one-way mechanism is configured to enable free rotation of the one component along a second opposite direction, during coasting mode of the powertrain, thereby avoiding drag of the electric motor. The vehicle may further comprise a mechanical friction brake connected to the gearing system via a component of the at least three components, the mechanical friction brake configured to reduce a degree of freedom of the two-degrees-of-freedom by restricting rotation of the component that the mechanical friction brake is connected to, to cause motion of the electric motor, during a braking mode of the powertrain, thereby regenerating energy by the electric motor and a processor.

The method may comprise detecting braking mode;

predefining a set point value based on: (i) transmission ratio of the vehicle and (ii) a parameter modifiable according to required regeneration ratio;

calculating a process value based on ratio between motor speed and final drive speed; and determining an amount of negative torque required for equality between the process value and the set point value, said negative torque to be applied by the electric motor during the regenerative braking mode.

Optionally, the detecting braking mode comprises determining motor spin and further determining no throttle is applied by a user.

Optionally, the step of calculating the process value comprises detecting motor speed and detecting final drive speed via respective speed sensors.

Optionally, the method further comprises calculating an error indicating the difference between the process value and the set point value.

Optionally, the required regeneration ratio is determined by at least one of: battery/capacitor state of charge (SOC), power ratings, driving speed, motor load, terrain, temperature, or any combination thereof.

BRIEF DESCRIPTION OF THE DRAWINGS

Some non-limiting exemplary embodiments or features of the disclosed subject matter are illustrated in the following drawings.

In the drawings:

FIG. 6A-6C are schematic illustrations of a cross-section view and isometric view of a transmission system as implemented in an electric motorcycle, according to embodiments of the present disclosure;

FIG. 8 is a table summarizing the characteristics of the transmission system configurations of FIGS. 7A-7D, all of which enable driving mode, coasting mode and regenerative braking mode, according to embodiments of the present disclosure.

Figure 1:
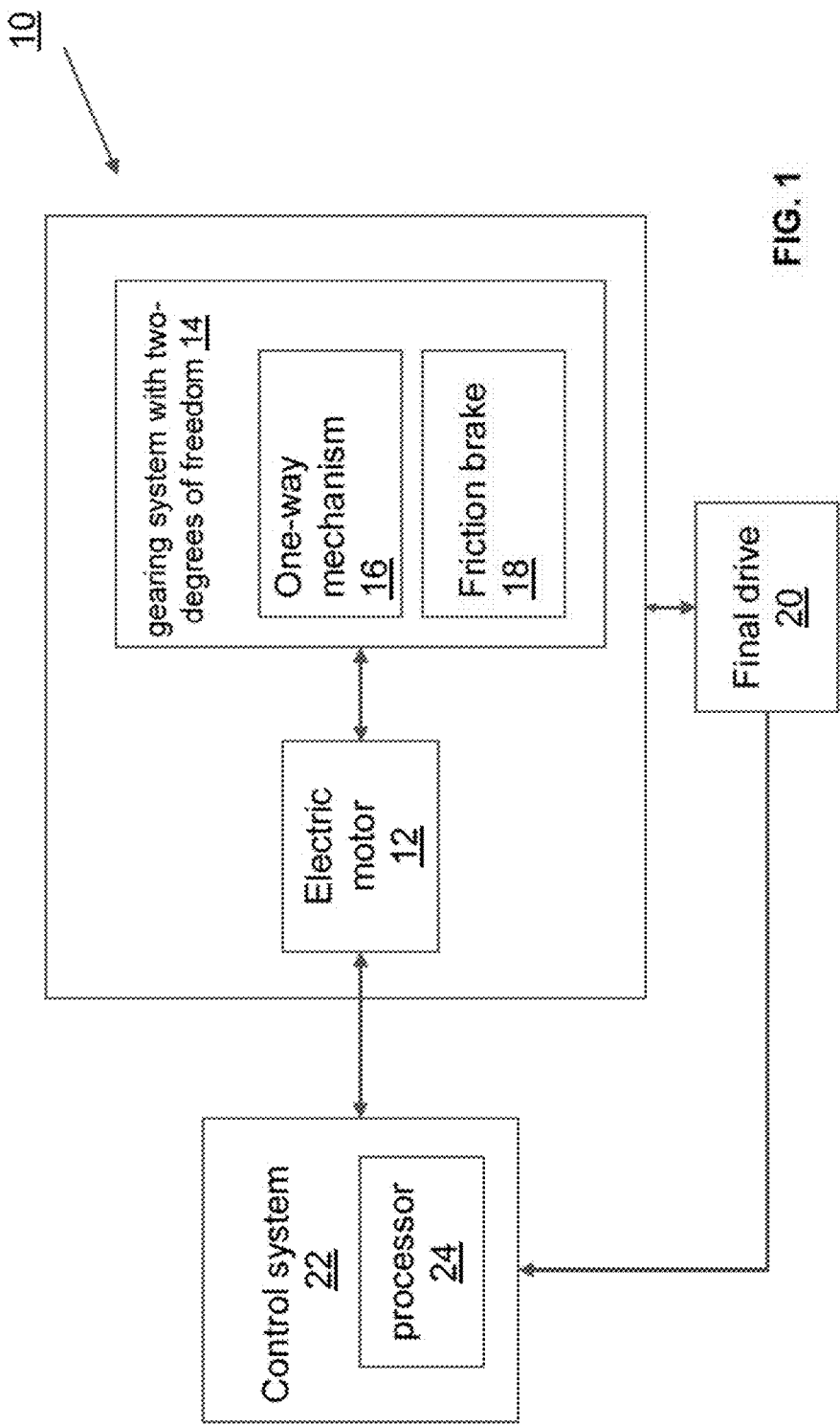
FIG. 1 is a schematic illustration of a two-degrees of freedom powertrain, according to some embodiments of the present disclosure.

With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described. References to previously presented elements are implied without necessarily further citing the drawing or description in which they appear.

Dimensions of components and features shown in the figures are chosen for convenience or clarity of presentation and are not necessarily shown to scale or true perspective. For convenience or clarity, some elements or structures are not shown or shown only partially and/or with different perspectives or from different point of views.

DETAILED DESCRIPTION

The present disclosure provides a transmission or gearing system configured to be implemented in a vehicle with an electric motor, and further configured to enable coasting as well as regenerative braking during operation of the vehicle. Such a transmission system may provide an energy efficient vehicle, which benefits from coasting that does not drag the motor, and thus reduces waste of kinetic energy during such coasting motion, as well as benefits from regenerating electrical energy during braking operation, which is also energy efficient.

The present disclosure provides two aspects, the first is the mechanical aspect of the gearing system, whose purpose is to connect between the electric motor and the final drive, e.g., the wheel of the vehicle, during driving mode, and to disconnect between the electric motor and the final drive during coasting mode and finally, to gradually reconnect between the electric motor and the final drive during braking mode.

The second aspect of the present disclosure is the control aspect, whose purpose is to determine the amount of braking (negative) torque that is applied on the electric motor of the vehicle in order to slow down the vehicle and regenerate energy.

Therefore, in braking mode, since the moving final drive, e.g., the moving wheel, is connected to the electric motor, and the motor is resisting that motion via the control system, the final drive or wheel will slow down, thereby slowing down the vehicle.

The term "vehicle" as used herein refers to any vehicle that comprises an electric motor. The vehicle may be a fully electric vehicle, a hybrid vehicle, e.g., a hybrid car, or a manual vehicle with electric motor assist, e.g., manual bicycle with motor assist.

The terms "gear", "gearing system" and "transmission system" are used interchangeably throughout the description.

Reference is now made to FIG. 1, which schematically illustrates a powertrain of a vehicle comprising a gearing system with two-degrees of freedom, according to some embodiments of the present disclosure. According to the present disclosure, the vehicle, via the powertrain, may have at least three operational modes, which may include power driving, coasting and regenerative braking. The present disclosure provides a powertrain 10 with two-degrees of freedom, which may comprise an electric motor 12, which is configured to convert electrical power or electrical energy to mechanical power or mechanical energy, a final drive 20, and a gearing system 14 with two-degrees of freedom. The gearing system 14 may be configured to transfer mechanical power from the electric motor 12 to the final drive 20. According to some embodiments, powertrain 10 may further comprise a one-way mechanism 16, which may typically be an overrunning clutch, a one-way clutch or a one-way bearing that may be incorporated as part of gearing system 14. The one-way mechanism 16 may be configured to reduce a degree of freedom of gearing system 14 for power driving mode. According to some embodiments, powertrain 10 may further comprise a mechanical friction brake 18 connected to gearing system 14. According to the present disclosure, the mechanical friction brake 18 is not connected to the final drive 20. The mechanical friction brake 18 may be controlled by a user to partially or fully reduce a degree of freedom of gearing system 14, for regenerative braking mode. In some embodiments, the mechanical friction brake 18 may comprise any one of a disc brake, a drum brake, a block brake or any other friction brake mechanisms, or any combination thereof.

According to some embodiments, powertrain 10 may further comprise a control system 22, which is configured to control operation of electric motor 12 during the various operational modes of powertrain 10. In some embodiments, control system 22 may comprise a processor 24, which is configured to determine the amount of negative torque that may be applied by electric motor 12 during the regenerative braking mode. According to some embodiments, gearing system 14 may comprise a planetary gear, a differential gear, and any other similar gearing system with two-degrees-of-freedom.

According to some embodiments of the present disclosure, mechanical friction brake 18 may be connected to an element of gearing system 14, and not to the final drive, such that powertrain 10 may enable regenerative braking, while powertrain 10 further enables coasting via one-way mechanism 16.

According to some embodiments, control system 22 may be configured to receive various inputs, typically speed related, e.g., the speed of electric motor 12, the speed of final drive 20, speed of any other component of the gearing system or of any component of the mechanical friction brake 18, and/or any combination thereof. In some embodiments, the input received by control system 22, may be received from different sensors that may be connected to different elements of powertrain 10. The received input may be analyzed by at least one processor 24 that may be incorporated as part of control system 22, according to a braking mode control algorithm, which will be described hereinbelow with respect to FIG. 4. In some embodiments, control system 22 may be configured to analyze the received input data and provide instructions to powertrain 10, to control the amount of power that electric motor 12 should apply per a specific mode of operation, e.g., power driving, coasting and regenerative braking.

Figure 2:
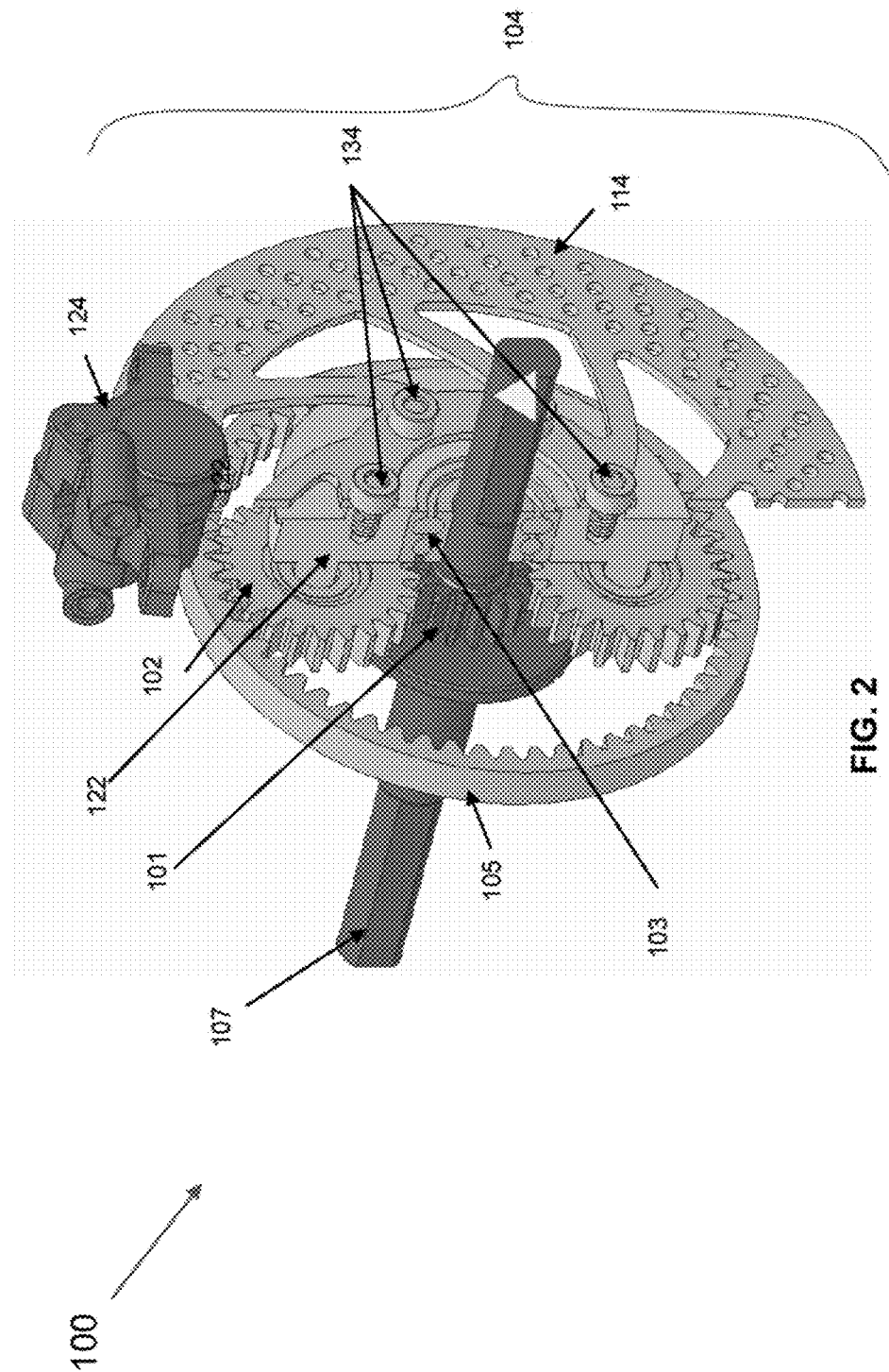
FIG. 2 is a schematic illustration of an isometric view of a transmission system, according to embodiments of the present disclosure.

Reference is now made to FIG. 2, which schematically illustrates an isometric view of a transmission system, according to some embodiments of the present disclosure. According to some embodiments, the transmission system of the present disclosure may be a gearing system 100 with two-degrees-of-freedom, which may comprise a planetary gear. Planetary gear 100 may comprise a sun gear 101 and one or more pinion gears or planet gears 102, which are configured to rotate with respect to rotation of sun gear 101. In some embodiments, sun gear 101 may be connected to an electric motor, e.g., electric motor 12 (FIG. 1), that may be rotating in relation to the vehicle chassis, represented by reference number 107. According to some embodiments, gearing system 100 may further comprise a planet carrier 122, which may be configured to rotate along a one-way bearing 103 (an example to one-way mechanism 16 in. FIG. 1), with respect to the vehicle chassis 107, such that rotation of planet carrier 122 is restricted to a single direction. In some embodiments, gearing system 100 may comprise a ring gear 105 that may be attached to the final drive (e.g., final drive 20 in FIG. 1). In some embodiments, the final drive may be a wheel, e.g., a bicycle wheel.

In some embodiments, gearing system 100 may be a gearing system with two-degrees of freedom, since one component may rotate two other components. In this case, in one example, sun gear 101 may be the input, while the output may be either ring gear 105, planet carrier 122 or both, depending on the degree of freedom that is enabled or restricted by gearing system 100, during its different operation modes.

According to some embodiments, rotation of sun gear 101 may cause one or more planet gears 102 to rotate, thereby rotating planet carrier 122, if the rotation direction of planet carrier 122 is enabled by the one-way bearing 103. Rotation of one or more planet gears 102, by rotation of sun gear 101, may also rotate ring gear 105.

According to some embodiments, gearing system 100 may comprise a mechanical friction brake system 104 (an example to mechanical friction brake 18, FIG. 1). In some embodiments, mechanical friction brake system 104 may comprise a disc brake 114 and a caliper 124. In some embodiments, disc brake 114 may be attached to planet carrier 122 such that disc brake 114 and planet carrier 122 may rotate together as one element. In some embodiments, disc brake 114 may be attached to planet carrier 122 via bolts, screws 134 or any other fastening means.

In some embodiments, caliper 124 may be fixed to electric vehicle chassis 107. Caliper 124 may comprise two brake pads each positioned on one of the two opposing sides of disc brake 114, which may be clamped onto disc brake 114 once a user activates the friction brake system 104, e.g., via a brake handle or brake pedal. According to some embodiments, either of the brake handle or brake pedal, through which friction brake system 104 may be operated, may be an inherent component of the vehicle, which requires no change once implementing gearing system 100 into vehicles with electric motors.

According to some embodiments, in 'powered driving' mode, the motor is turning since it is being electrically powered, i.e., the electric motor 12 and its dependent sun gear 101 rotate, which means that during 'powered driving' the sun gear 101 is the input of gearing system 100. In one example, the electric motor 12 may turn in a direction opposite the forward driving direction of the final drive 20. During 'powered driving' mode, the planet carrier 122 may be prevented from rotating in the same direction as electric motor 12, by the one-way mechanism 16, e.g., one-way bearing 103, thus forcing planet carrier 122 to be stationary. Accordingly, gearing system 100 is reduced by one degree of freedom. That is, all the torque is transferred from the electric motor 12 and its dependent, e.g., sun gear 101, to the final drive 20 and its dependent, e.g., ring gear 105, via one or more planet gears 102. In driving mode or powered driving mode, the ring gear 105 is the output of gearing system 100.

According to some embodiments, in 'coasting' mode, ring gear 105 is the input of gearing system 100, since ring gear 105 turns without being powered by the electric motor 12. When ring gear 105 turns, it may rotate one or more planet gears 102, which in turn may freely rotate planet carrier 122 in the direction enabled and dictated by the one-way bearing 103. In this example, the rotation enabled direction is the forward driving direction of the final drive 20. Hence, during coasting mode, no torque is transferred to sun gear 101 via planet carrier 122, allowing sun gear 101 and thereby allowing the electric motor 12 connected to sun gear 101, to rest.

According to some embodiments, in 'braking' mode, mechanical brake force may be applied by the user onto planet carrier 122. A user may operate mechanical friction brake system 104, e.g., via use of a brake handle or brake pedal. In some embodiments, the brake handle or brake pedal may be connected to the mechanical friction brake system 104, which may comprise caliper 124 and disc brake 114. In 'braking' mode, ring gear 105 is the input of gearing system 100, since ring gear 105 turns without being powered by the electric motor 12. When ring gear 105 turns, it may rotate one or more planet gears 102, which in 'braking' mode may not freely rotate planet carrier 122 since the planet carrier 122 is restricted by the friction brake system 104. Torque is thus transferred from the ring gear 105, which is still rotating due to vehicle motion, to the electric motor 12 through sun gear 101 via one or more planet gears 102, causing sun gear 101 and thus electric motor 12 to rotate.

In some embodiments, as soon as a user stops activating the electric motor 12, e.g., by ceasing to operate a throttle handle or a throttle pedal, the operation mode is changed from driving to coasting, e.g., as the electric motor 12 slows down, the planet carrier 122 begins to rotate. When a user operates mechanical friction brake system 104, caliper 124 may be clamped onto both sides of disc brake 114, and the mechanical brake force may be applied onto planet carrier 122, since disc brake 114, which is part of mechanical friction brake system 104, is connected to planet carrier 122 such that disc brake 114 and planet carrier 122 rotate as a single unit.

For example, a user may press the brake handle, thereby causing caliper 124 to slow the free rotation of disc brake 114 and of planet carrier 122, since these are connected to one another to create a single unit. Torque is thus transferred from the ring gear 105, which is still rotating due to vehicle motion, to the electric motor 12 through sun gear 101 via one or more planet gears 102, causing sun gear 101 and thus electric motor 12 to rotate. A control system, e.g., control system 22, may cause the electric motor 12 to apply negative torque onto sun gear 101 in order to slow the vehicle and regenerate energy. That is, since planet carrier 122 is forced to slow down by the mechanical friction brake system 104, gearing system 100 is reduced to one degree of freedom, and since ring gear 105 rotates, ring gear 105 forces sun gear 101 and thus the electric motor 12 to rotate via rotation of one or more planet gears 102. Forcing sun gear 101 and thus the electric motor 12 to rotate by rotation of ring gear 105 may regenerate energy, since the electric motor 12 is not electrically powered in order to rotate (as in driving mode) but the electric motor 12 is rather mechanically forced to rotate, thereby regenerating energy. In some embodiments, the regenerated energy may be stored in an energy storage device such as a battery or a capacitor, for later use.

According to the present disclosure, the disk brake 114 is not slowing the vehicle directly but is rather used to limit a degree of freedom of the two-degrees-of-freedom. Thereby, most of the braking energy may be regenerated while only a small amount of energy may be wasted by friction and heat, as will be explained in detail with respect to FIG. 4. In gearing system 100 illustrated in FIG. 2, by connecting disc brake 114, to one of the planetary gear system's elements, e.g., the planet carrier 122, when the brakes are applied, the electric motor 12 is forced to rotate not by being electrically powered but rather due to the reduction of one degree of freedom of the two-degrees-of-freedom. Thereby, electric motor 12 generates electric energy during braking mode.

According to some embodiments, during driving mode, the user may apply the throttle and the electric motor 12 may produce positive torque according to the throttle's position. During coasting mode, the user may release the throttle and the electric motor 12 may eventually decelerate to a complete stop. Aid finally, during braking mode, the user may apply the friction brake system 104 to slow down the element of the transmission system that is connected to the friction brake system 104. For example, according to FIG. 2, the element that is slowed down by friction brake system 104 is planet carrier 122. Slowing down planet carrier 122 causes the electric motor 12 to spin. The control system 22, may detect the electric motor 12 is spinning by an external force and not by a throttle command, and may thus respond by applying controlled negative torque onto the electric motor 12, which may lead the electric motor 12 to act as a generator, thus enabling regenerative braking.

Accordingly, in order for control system 22 to properly control operation of electric motor 12, while switching between modes of operation, such modes are to be determined and distinguished from one another.

Figure 3:
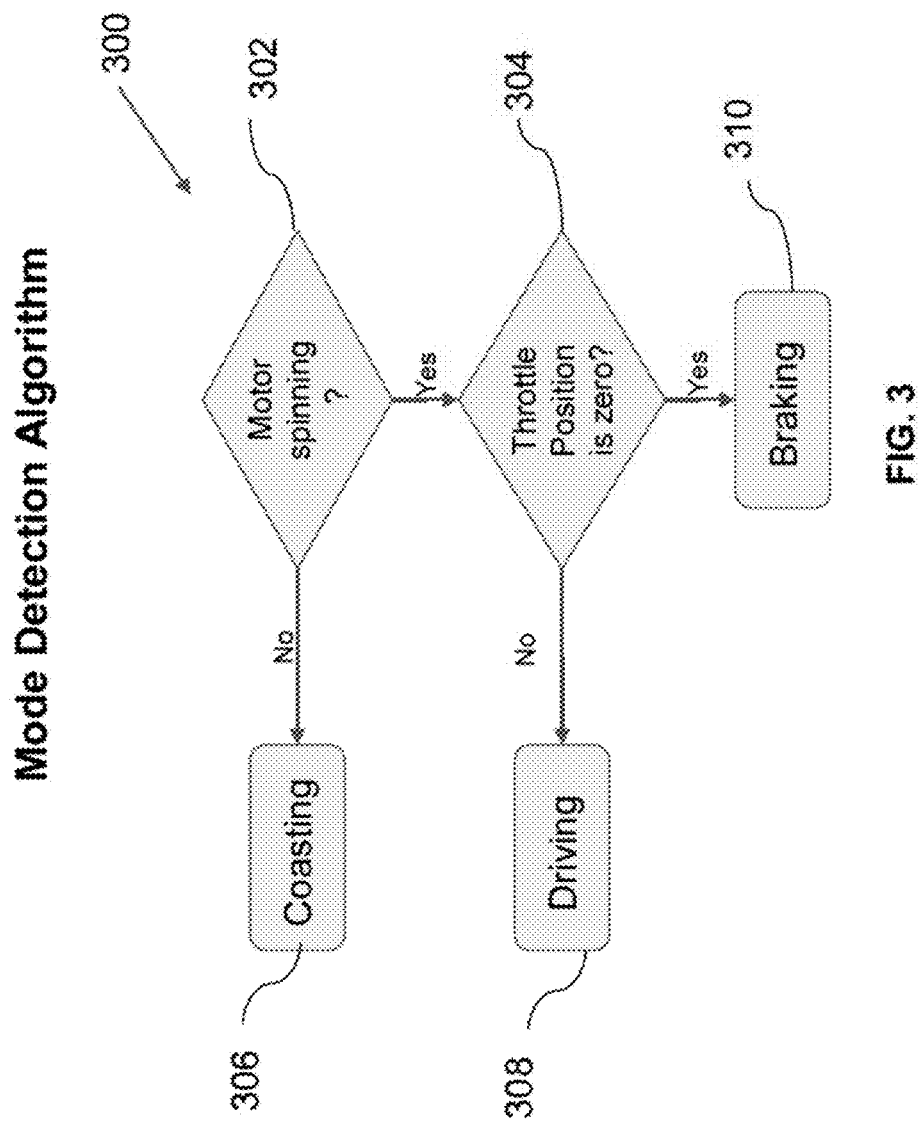
FIG. 3 is a schematic illustration of a mode detection method, according to embodiments of the present disclosure.

Reference is now made to FIG. 3, which schematically illustrates a mode detection method, according to some embodiments of the present disclosure. In some embodiments, mode detection method 300 may be executed by control system 22, e.g., via processor 24. In some embodiments, mode detection method 300 may comprise determining whether the electric motor 12 is spinning (302), for example, by sensing electric motor speed, e.g., via a speed sensor that may be connected to the electric motor 12. If the control system 22 or processor 24, determines that electric motor 12 is not spinning, control system 22 may identify that the vehicle is in coasting mode (306). If control system 22 or processor 24, determines that electric motor 12 is spinning, then a determination is required with respect to throttle position (304). In case control system 22 or processor 24, determines that electric motor 12 is spinning and the throttle position does not equal '0', i.e., throttle is activated, control system 22, or processor 24, may identify that the vehicle is in driving or power-driving mode (308). However, if control system 22, or processor 24, determines that electric motor 12 is spinning and the throttle position equals '0', then control system 22, or processor 24, may identify that the vehicle is in braking mode (310). This is since electric motor 12 is spinning but not due to throttle activation, e.g., throttle position is not zero, but rather due to an external force, i.e., operation of friction brake system, e.g., friction brake 18 (FIG. 1) or friction system 104 (FIG. 2).

As a safety measure, an ON/OFF sensor may be added to the brake handle/pedal to force a throttle position of zero whenever the brakes are applied. In such a case, once the mechanical brakes are applied, any other command, such as operation of the electric motor 12 via a throttle, will be overridden by the control system 22 in FIG. 1, as soon as the brake sensor senses the operation of the mechanical brakes. That is, regardless of user throttle position, once a brake sensor detects operation of the mechanical brakes, the control system 22 will enter braking mode (310) and the vehicle will begin to slow down.

Figure 4:
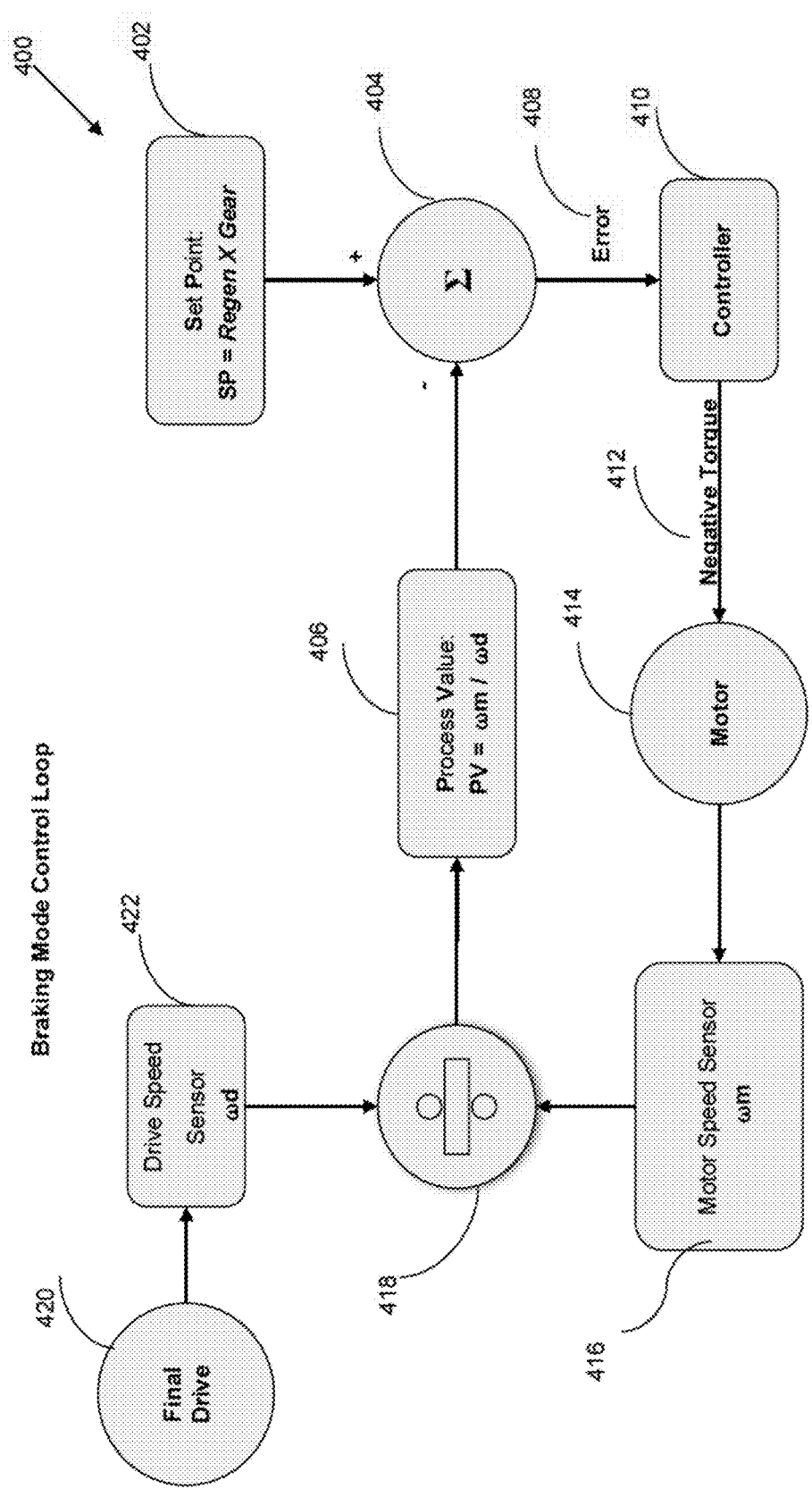
FIG. 4 is a schematic illustration of a braking mode control algorithm, according to embodiments of the present disclosure.

Reference is now made to FIG. 4, which is a schematic illustration of a braking mode control algorithm, according to embodiments of the present disclosure. According to embodiments of the present disclosure, the amount of negative torque that is to be applied by electric motor 12 in a continuous manner, in order to provide a smooth braking motion, may be determined by control system 22, e.g., via processor 24, according to braking mode control algorithm 400.

In some embodiments, braking mode control algorithm 400 may be a feedback loop. Braking mode control algorithm 400 may comprise calculating a loop Process-Value (PV) 406, which may represent the ratio between the motor speed and the final drive speed, which may be calculated according to equation (1):

$$PV = \omega m / \omega d \quad (1)$$

whereby:
ωm denotes motor speed; and
ωd denotes final drive speed.

In some embodiments, motor speed may be provided by motor speed sensor 416, and final drive speed may be provided by final drive speed sensor 422. The ratio between motor speed and final drive speed may be calculated in operation 418, according to equation (1).

In some embodiments, braking mode control algorithm 400 may comprise setting a loop Set-Point (SP) ratio 402, which may have a value calculated according to equation (2):

$$SP = Regen \times Gear \quad (2)$$

whereby:
Regen denotes a parameter with a value smaller than 1, which represents a ratio between motor speed and final drive speed; and Gear denotes the transmission ratio of the gearing system with two-degrees of freedom, in driving mode, when a degree of freedom is fully reduced.

According to some embodiments, when 'Regen' has a value near '1', this indicates that most of the kinetic energy will be regenerated by the electric motor 12, while when 'Regen' has a value near '0', this indicates that most of the kinetic energy will be dissipated as heat by the mechanical braking system 104.

In some embodiments, in order to provide an energy efficient gearing system, 'Regen' should be a number as close as possible to 1, though smaller than 1.

In some embodiments, the energy regenerated by electric motor 12 may be stored in an energy storage device such as a battery or a capacitor. When said storage device reaches or is about to reach its maximum capacity, or when the regenerative power is close to the maximum rating dictated by the manufacturer of either of the components of the electrical system, 'Regen' can be set to a low value, thus minimizing regenerative braking power and maximizing mechanical braking power. That is, in some embodiments, 'Regen' may be changed or modified during operation of the vehicle to conform to various system restrictions, by control system 22, e.g., via processor 24.

In some embodiments, 'Regen' may be a parameter modifiable according to required regeneration ratio, which may be changed by control system 22 based on battery/capacitor state of charge (SOC), power ratings, driving speed, motor load, terrain, temperature, or any combination thereof. Other and/or additional parameters may affect 'Regen'.

In some embodiments, braking mode control algorithm 400 may comprise receiving error 408 by a controller 410, which may be included as part of control system 22. Error 408 may be calculated by a subtraction of the Process Value (PV) from the Set Point (SP). In response to receiving error 408, controller 410 may control the amount of negative torque 412 applied by electric motor 414 (e.g., electric motor 12, FIG. 1) in order to achieve equality between the SP ratio and the PV ratio, resulting in error 408 being equal to zero.

The amount of negative torque applied by electric motor 414 (e.g., electric motor 12) is proportional to the negative error 408. The greater negative error 408 is, the more negative torque is applied by electric motor 414. In case error 408 is positive, i.e., that the absolute value of PV is smaller than the absolute value of the SP, no negative torque would be applied but neither would positive torque be applied. That is, the maximum positive torque defined by control system 22 during braking mode is '0', since during braking mode only negative torque should be applied by the electric motor, to slow down the vehicle while regenerating energy.

In some embodiments, the more brake pressure is applied by a user, the more the speed of planet carrier 122 is reduced. The reduction in planet carrier speed may be reflected as an increase in PV, since motor speed increases when planet carrier speed is reduced. In response, controller 410 may increase negative torque onto motor 414, thereby increasing braking force in order to reduce the PV value and achieve equality between the PV and the SP.

On the contrary, the less brake pressure applied by the user, the less the speed of planet carrier 122 is reduced. The less the speed of planet carrier 122 is reduced, may be reflected as a reduced PV, which may cause controller 410 to reduce negative torque onto motor 414, thereby to reduce braking force.

For example, a gearing system 100 of a planetary gear type, may be represented by the following equation (3):

$$(R \div S) \times Tc = R \times Tr + Ts \times S \qquad (3)$$

whereby:
R denotes no. of Ring gear teeth;
S denotes no. of Sun gear teeth;
Tc denotes no. of Turns of the planet carrier;
Tr denotes no. of Turns of the ring gear; and
Ts denotes no. of Turns of the sun gear.
For this example, the gearing system may implement the following no. of Sun gear teeth and no. of Ring gear teeth: S=16, R=64.
Implementing a reduction ratio of '−4', i.e., in driving mode, for 1 rotation of the final drive in a first direction, the sun gear rotates 4 rotations in a second direction that is opposite the first direction, i.e., Gear=−4.
Optionally, coasting may be at 200 RPM, i.e., ωd=200.
Since the mode of operation is coasting, the electric motor stands still and does not rotate, hence: ωm=0.
Accordingly, following equation (3), for a ring speed of 200 RPM and motor speed of 0 RPM, the planet carrier speed (Tc) is 160 RPM.
In this example, 'Regen' is predefined as follows: Regen=0.9.
According to this example, when the user applies the brake, the planet carrier, e.g., planet carrier 122, may slow down, the electric motor 414 or electric motor 12, may begin to rotate, and the control system 22 may regulate motor braking torque (i.e., negative torque) so that the electric motor may rotate at a speed satisfying the SP requirement.
(2) SP=Regen×Gear=0.9*(−4)=−3.6
In order to satisfy the SP requirement, PV should equal SP, in order to avoid presence of error 408:

$$PV = \omega m / \omega d = \omega m / 200 = -3.6 \qquad (1)$$

$$=> \omega m = -720$$

Thus, the required braking mode motor speed for the vehicle speed of the present example, is −720 RPM, which means the electric motor should rotate at a speed of 720 RPM at a direction opposite the direction of rotation of the ring (e.g., the final drive 20).
Accordingly, following equation (3), for a ring speed of 200 RPM and motor speed of −720 RPM, the planet carrier speed would be 16 RPM.
If the user applies more pressure on the brake, the planet carrier 122 will decrease its speed and consequently the electric motor 12 will increase its speed, for example, to −730 RPM. Thus, control system 22 will be required to increase brake torque to get the motor speed back to −720 RPM, in order to continuously satisfy the SP requirement by maintaining equality between the PV and the SP. If the user applies less pressure on the brake, the planet carrier will increase its speed and consequently the motor will decrease its speed, for example, to −710 RPM. Thus, the control system will decrease brake torque to get the motor speed back to −720 RPM, in order to continuously satisfy the SP requirement. Thus, the more pressure is applied on the brake by the user, the more the control system 22 increases brake torque, while the less pressure applied on the brake, the less brake torque is applied by control system 22, which enables intuitive operation of the brake by the user.
In some embodiments, the control system 22, e.g., via processor 24, responds to changes in electric motor speed by adjusting brake/negative torque that is applied onto the electric motor 12, in a continuous manner, in order to maintain fulfillment of the SP requirement throughout the entire operation of the vehicle.
In some embodiments, the percentage of energy lost on the friction brake, e.g., mechanical friction brake system 104, is proportional to the 'braking mode' planet carrier speed vs. 'coasting mode' planet carrier speed, which in this example is 10%:
16/160=10%. That is, only 10% of the braking energy will be dissipated by the friction brake, while the rest of the energy may be available for regenerative braking.
Accordingly, by adjusting the value of 'Regen' to be as close to 1 as practically possible, while 'Regen' still smaller than 1, in order to enable brake torque adjustment by the control system 22, energy loss due to friction brake may be minimal, which means the gearing system 100 of the present disclosure is highly energy efficient.
The value of 'Regen' must be smaller than 1, since controller 410 or control system 22, e.g., via processor 24, determines the amount of negative torque applied on electric motor 12 based on the value of error 408, i.e., in proportion to the amount that PV is higher than SP. That is, in order to generate negative torque a negative error 408 is required. If the value of 'Regen' would have been equal to 1, then the PV ratio could not be greater than that of the SP ratio, and the error 408 could not be negative, which means no braking torque would be applied on electric motor 12.
According to some embodiments, the electric motor 12 may have a minimum braking torque that is not zero, and a braking torque below that minimum may be achieved by applying gentle pressure on the brake system, hence transferring only partial torque from the final drive 20 to the electric motor 12. According to the example hereinabove, when coasting at 200 RPM, the user may apply the brakes very lightly, thereby slowing the planet carrier from its coasting speed of 160 RPM to a slightly lower speed e.g., 150 RPM, causing the electric motor to rotate slowly at −50 RPM, following equation (3). In such a scenario, the absolute value of the PV is smaller than the absolute value of the SP, thus error 408 is positive. Accordingly, the control system 22 will apply zero negative torque and no energy will be regenerated. However, since the electric motor 12 has some internal friction, it will gently slow the vehicle in proportion to the electric motor's speed, which is controlled by the amount of brake force applied by the user.
In some embodiments, the vehicle need not require a designated sensor to detect brake handle/pedal position. Instead, the adjustment of brake torque applied on the electric motor 12 may be determined by the control system 22 in response to the amount of brake applied by the user on the brake handle/pedal, as explained hereinabove. Thus, no change is required to existing brake mechanisms.
According to some embodiments, when initiating the braking process, the electric motor needs to spin-up from zero to the braking RPM (e.g., −720 RPM according to the above example). This increase in electric motor speed may be gradual and may be controlled by the amount of brake force applied by the user, as explained hereinabove with respect to braking mode control algorithm 400. That is, unlike some current designs that include solenoids acting as an electromagnetic clutch, which are of instantaneous engagement of the motor that is of an unpleasant 'ON/OFF' or '0/1' operation, the present disclosure provides a gradual increase in motor speed that enables smooth engagement of the electric motor 12 according to user input, which is further coherent with natural user operation of current brake systems.

According to some embodiments of the present disclosure, the powertrain system of the present disclosure provides a continuously variable braking torque, from zero negative torque to the maximum negative torque capability of the electric motor 12, by responding to brake pressure applied by the user in a seamless and intuitive way via the braking mode control feedback loop 400.

Figure 5A:
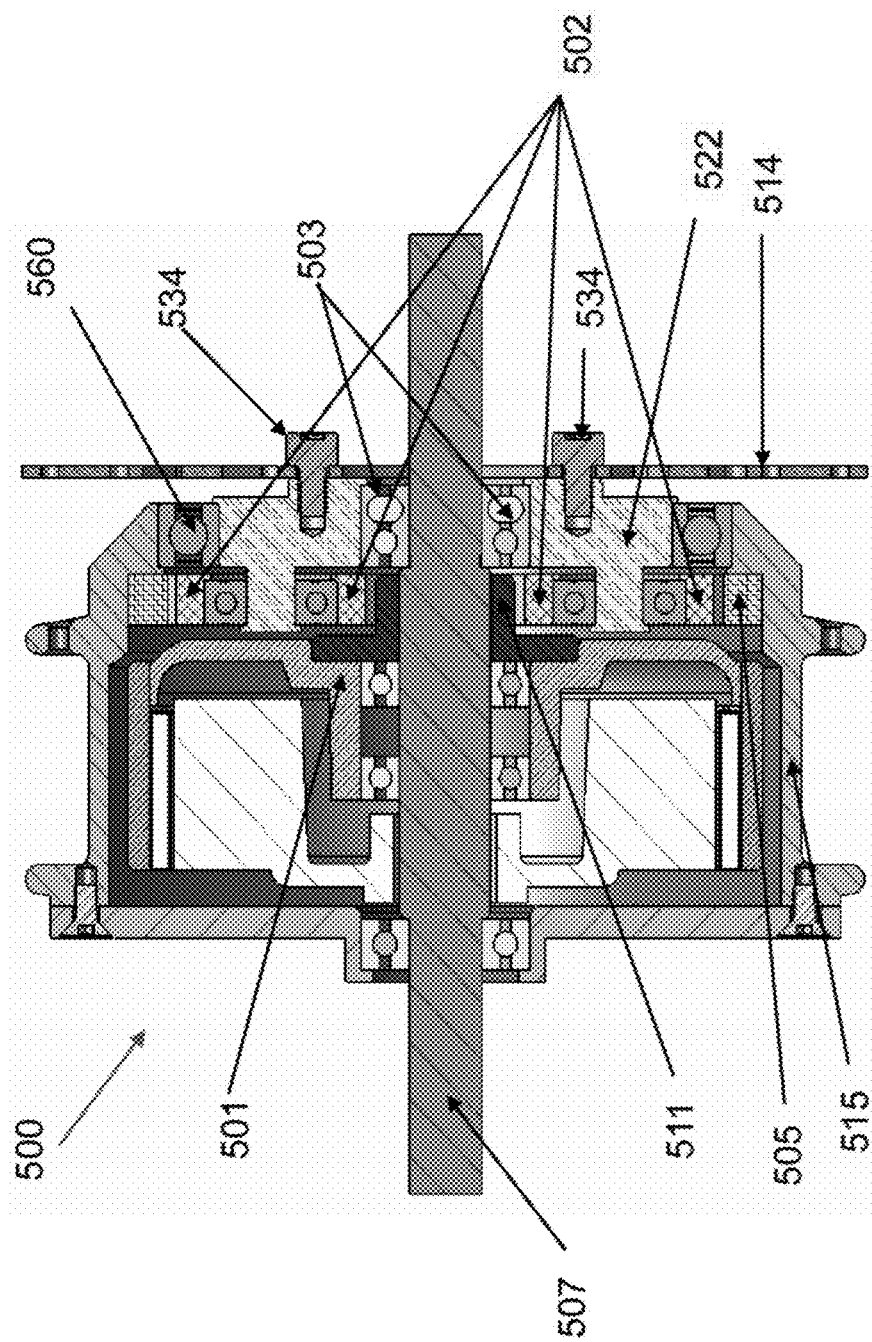
FIG. 5A-5C are schematic illustrations of a cross-section view and isometric views, of a transmission system as implemented in an electric bicycle, according to embodiments of the present disclosure.
Figures 5B, 5C:
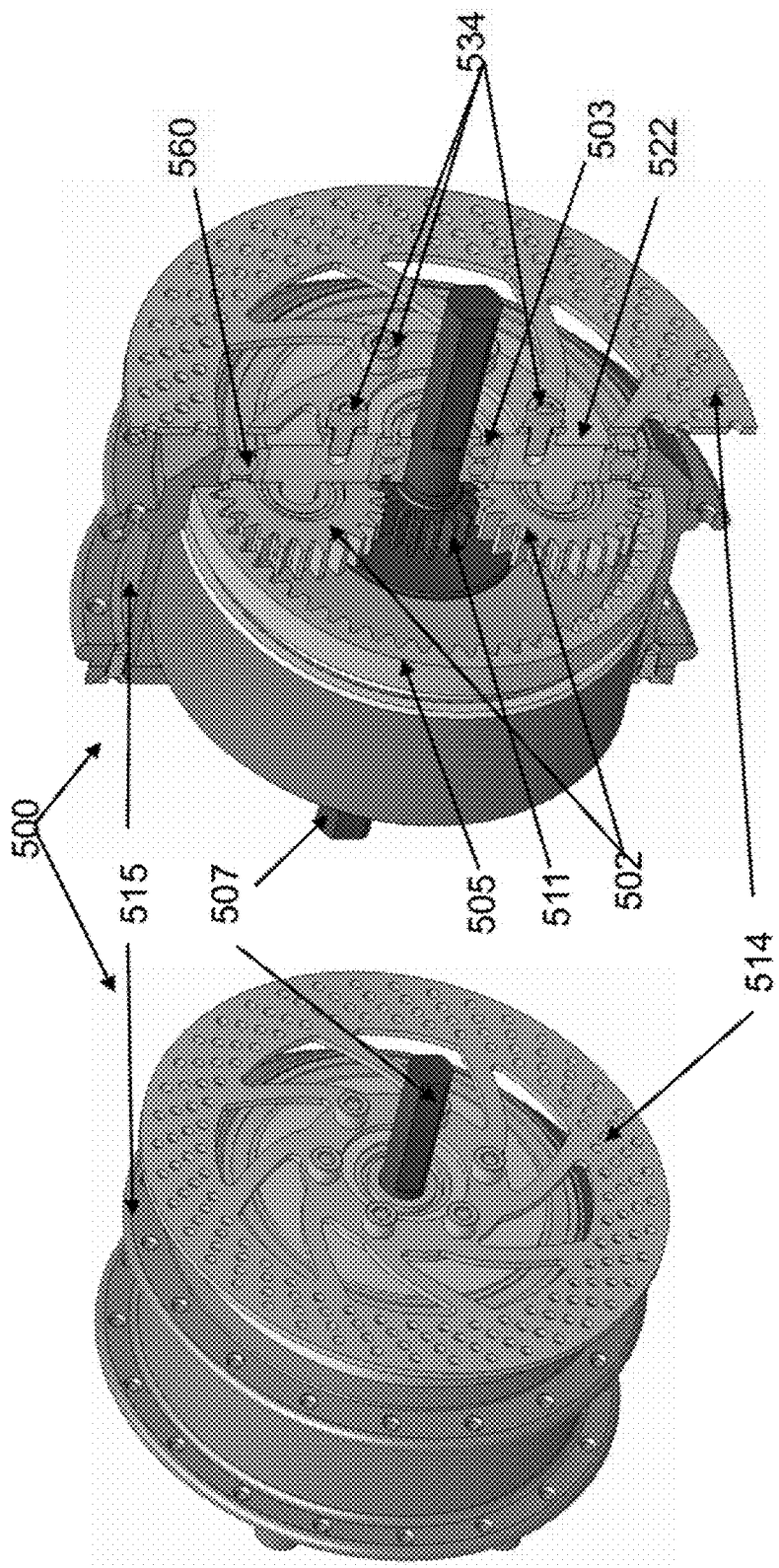

Reference is now made to FIGS. 5A-5C, which are schematic illustrations of a cross-section view, an isometric view with a partial hub and an isometric view with a full hub, respectively, of a transmission system as implemented in an electric bicycle (bike), according to embodiments of the present disclosure. In some embodiments, the transmission system of the present disclosure may be implemented as part of an electric bike geared hub motor system 500. In some embodiments, electric bike geared hub motor system 500 may comprise an electric motor rotor 501, which may be attached to a gearing system with two-degrees of freedom, which may be similar to gearing system 100 (FIG. 2). The gearing system may comprise a sun gear 511, at least one planet gear 502, e.g., two planet gears 502, and a planet carrier 522. The final drive 20 may comprise a ring gear 505 located within and attached to a hub or case 515. In some embodiments, motor rotor 501 may be attached to sun gear 511. In some embodiments, planet carrier 522 may rotate around static shall 507, which is equivalent to the chassis of the electric bike, via a one-way mechanism, e.g., one-way bearing 503. In some embodiments, a friction brake mechanism, which may comprise a disc brake 514 may be attached to planet carrier 522, e.g., via bolts, rivets, screws 534 or any other fastening means.

In some embodiments, hub or cover 515 may be configured to cover the components of the gearing system, while maintaining the disc brake 514 as the only component outside the space defined by hub 515

In some embodiments, electric bike geared hub motor system 500 may further comprise a bearing 560, which may be part of hub 515, and through which disc brake 514 may be connected to planet carrier 522. Bearing 560 may enable disc brake 514 to rotate with planet carrier 522 as a single unit that can rotate independently from hub 515.

Figure 6A:
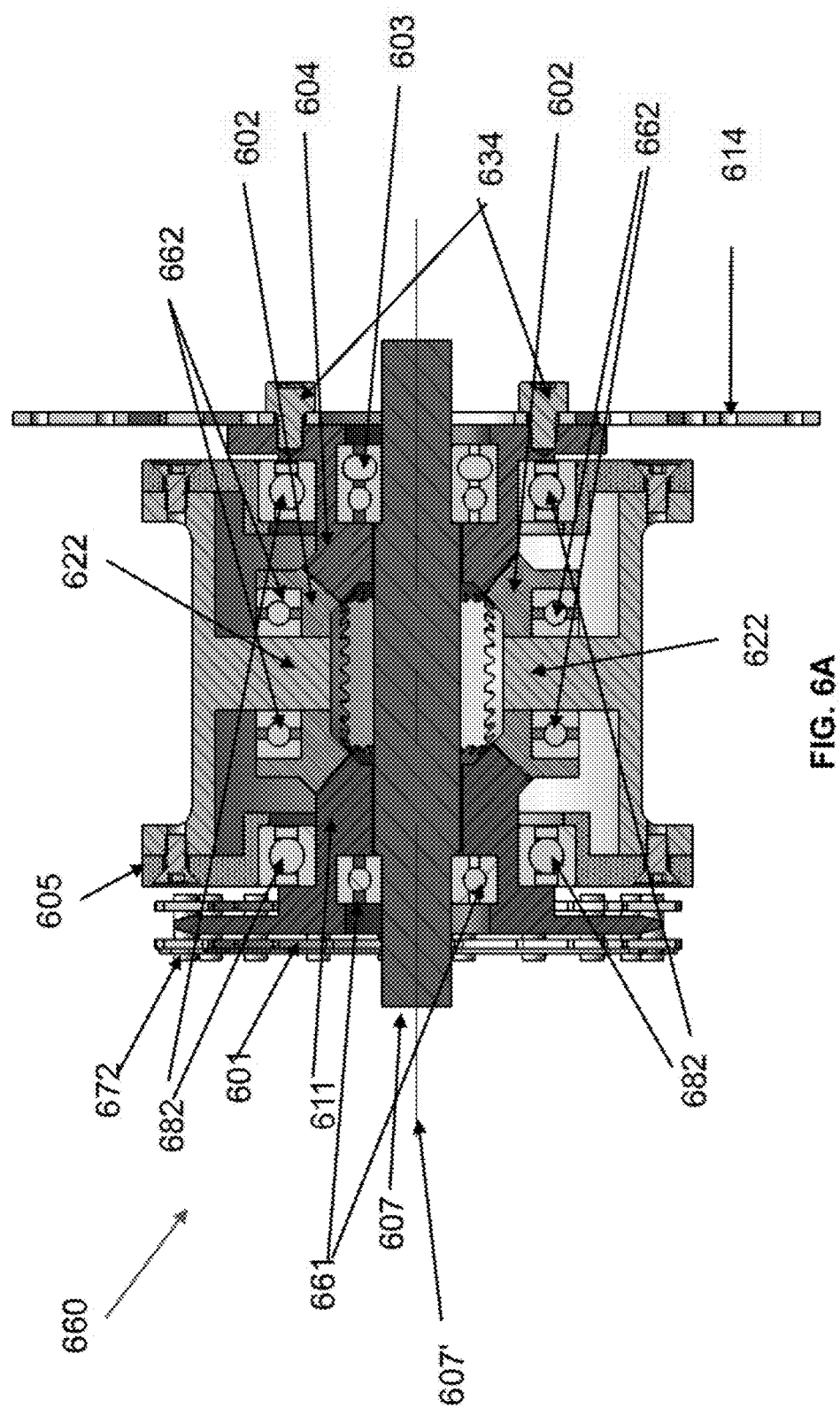
Figure 6C:
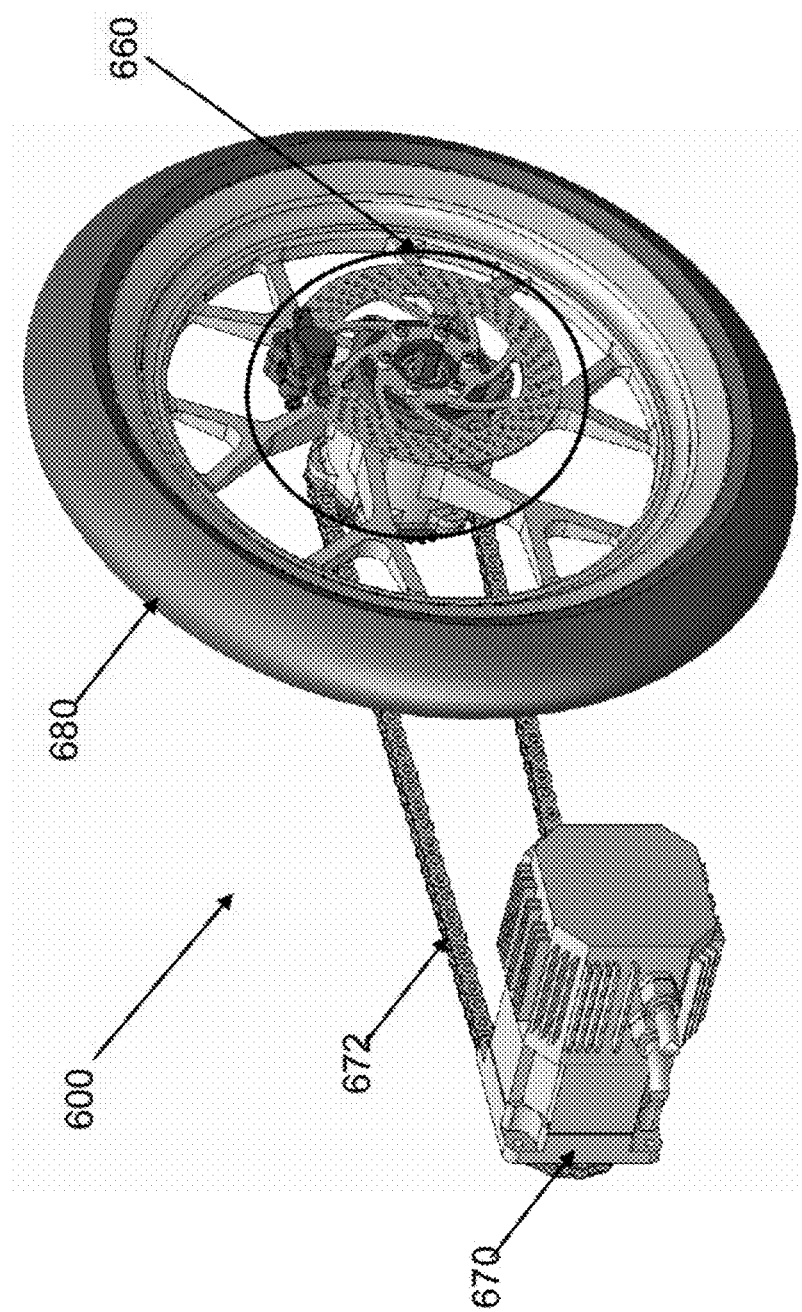

Reference is now made to FIGS. 6A-6C, which are schematic illustrations of a cross-section view and isometric views, respectively, of a transmission system as implemented in an electric motorcycle, according to embodiments of the present disclosure. In some embodiments, the transmission system 660 may be implemented as part of an electric motorcycle rear hub, powered externally by mid-drive motor system 600. According to some embodiments, the gearing system 660 with two-degrees-of-freedom implemented as part of the electric motorcycle motor system 600 is implemented in a form resembling a power differential, however, it includes the same basic principles of the transmission system of the present disclosure, which enables free coasting as well as regenerative braking.

In some embodiments, electric motorcycle motor system 600 may comprise a motor 670 (FIG. 6B), which may be externally linked, e.g., via a chain 672 or any other mechanism, to a sprocket 601 (FIG. 6A). The sprocket 601 may be attached to gearing system 660 via a first side gear 611. Rotation of first side gear 611 is enabled by first side gear bearings 661. Rotation of first side gear 611 causes rotation of horizontal planet gears 602, which may be mounted on a rack carrier 622. Rack carrier 622 may be attached to the final drive 605. Rotation of horizontal planet gear 602 may cause rotation of rack carrier 622. Rotation of horizontal planet gears 602 may be enabled via bearings 662. Rotation of horizontal planet gear 602 may further cause rotation of second side gear 604. In some embodiments, the second side gear 604 may be mounted on a one-way-bearing 603, which is configured to dictate rotation of the second side gear 604 in one direction only. Second side gear 604 may rotate with respect to static shaft or chassis 607. Rotation of rack carrier 622 with respect to the first and second side gears 611 and 604, respectively, may be enabled by bearings 682. In some embodiments, a disc brake 614 may be attached to second side gear 604, e.g., via bolts, rivets or screws 634.

The power differential gearing system illustrated in FIGS. 6A-6C may be represented by the following equation (4):

$$Trc=(T1+T2)/2 \qquad (4)$$

whereby:
T1 denotes no. of Turns of the first side gear (e.g., first side gear 611)
T2 denotes no. of Turns of the second side gear (e.g., second side gear 604)
Trc denotes no. of Turns of the rack carrier (e.g., rack carrier 622).

During driving mode, electric motor 670 may supply power to operate rotation of sprocket 601, which may in turn rotate first side gear 611. Second side gear 604 may be prevented from moving during driving mode due to rotation restriction dictated by one-way bearing 603. In some embodiments, one-way bearing 603 may allow second side gear 604 to only rotate along a single direction, e.g., the direction along which first side gear 611 rotates. Accordingly, rotation of first side gear 611 may cause one or more horizontal planet gears 602 to rotate, which may cause rack carrier 622 to rotate, thereby rotating the final drive 605 and wheel 680.

During coasting mode, wheel 680 and final drive 605, rotate with rack carrier 622, and torque is transferred via the horizontal planet gears 602 to the second side gear 604 in the direction allowed by the one-way hearing 603. Thus, second side gear 604 and disc brake 614, which is connected to second side gear 604, rotate as a single unit. Accordingly, rotation of horizontal planet gears 602 enables first side gear 611 as well as sprocket 601, which is directly connected to first side gear 611, to rest, thereby allowing motor 670 to rest.

During braking mode, final drive 605 and wheel 680 rotate with rack carrier 622. Since brakes are applied during braking mode, movement of disc brake 614 and of second side gear 604, which is connected to disc brake 614, is restrained and torque is transferred via the horizontal planet gears 602 to the first side gear 611 and thus to sprocket 601, thereby causing the motor 670 to rotate.

In braking mode, motor 670 does not rotate due to electric power supplied to motor 670, as in driving mode. Instead, during braking mode, motor 670 is mechanically forced to rotate, thereby regenerating energy.

In some embodiments, the braking mode control feedback loop 400 (FIG. 4) may be further implemented with respect to the power differential gearing system of FIGS. 6A-6C. A differential topology may implement a reduction ratio of 2 according to equation (4), i.e., in driving mode, for 1 rotation of the final drive in a first direction, the first side gear (T1) rotates 2 rotations in the same direction, Gear=2.

Optionally, coasting may be at 200 RPM, i.e., $\omega d=200$.

Since the mode of operation is coasting, the electric motor stands still and does not rotate, hence: $\omega m=0$.

According to equation (4), for a rack carrier speed (Trc) of 200 RPM and first side gear speed (T1) of 0 RPM, the second side gear speed (T2) is 400 RPM.

In this example 'Regen' is predefined as follows: Regen=0.9.

According to this example, when the user applies the brake, the second side gear (T2) may slow down, the electric motor may begin to rotate, and the control system, e.g., control system 22 (FIG. 1) as implemented by the braking mode control feedback loop 400, may regulate motor braking torque (i.e., negative torque) so that the electric motor 670 may rotate at a speed satisfying the SP requirement.

According to equation (2), for this example, SP=Regen× Gear=0.9*2=1.8

In order to satisfy the SP requirement, PV should equal SP to avoid presence of error 408:

$$PV = \omega m/\omega d = \omega m/200 = 1.8$$

$$\Rightarrow \omega m = 360$$

Thus, the required braking mode motor speed per the vehicle speed of the present example, is 360 RPM, which means the electric motor rotates at a speed of 360 RPM at the same direction as the rack carrier.

Accordingly, following equation (4), for a rack carrier speed (Trc) of 200 RPM and first side gear speed (T1) of 360 RPM, the second side gear speed (T2) is 40 RPM.

In some embodiments, the percentage of energy lost on the friction brake, e.g., mechanical friction brake system 104, in this case, disc brake 614, is proportional to the 'braking mode' speed of the second side gear (T2) vs. 'coasting mode' speed of the second side gear (T2), which in this example is 10%: 40/400=10%

That is, only 10% of the braking energy will be dissipated by the friction brake, while the rest of the energy may be available for regenerative braking.

Reference is now made to FIGS. 7A-7D, which are schematic illustrations of several configurations of transmission systems, all of which enable driving mode, coasting mode and regenerative braking mode, according to embodiments of the present disclosure. Each of configurations 7A, 7B, 7C and 7D, may incorporate a gearing system with two-degrees-of-freedom, which may comprise a one-way mechanism, e.g., a one-way bearing, that is configured to restrict rotation of one of the elements of the gearing system during driving mode, while further comprising a braking system that is configured to restrict rotation of one of the elements of the gearing system during braking and regenerative braking mode.

Figure 7B:
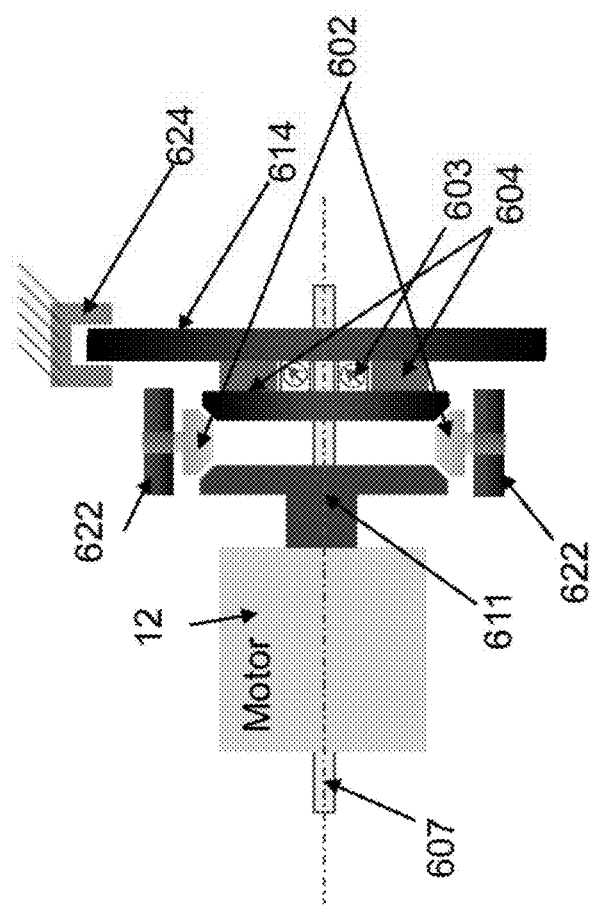
FIGS. 7A-7D are schematic illustrations of several configurations of transmission systems, according to embodiments of the present disclosure.
Figure 7A:
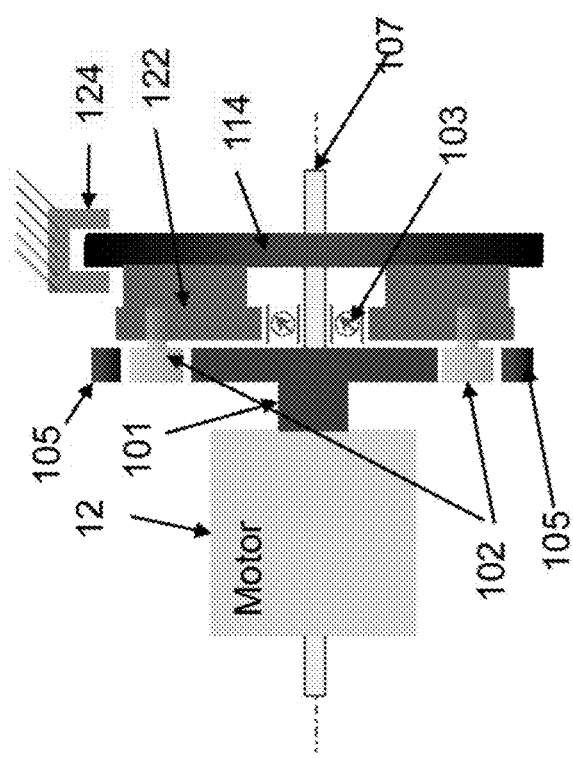

In some embodiments, the configuration of FIG. 7A is equivalent to a planetary gear transmission system, similar to planetary gear system 100 illustrated in FIG. 2 and gearing system 500 in FIGS. 5A-5C. Configuration 7A comprises a motor 12 configured to rotate a sun gear 101, which in turn may rotate one or more planet gears 102, which in turn may rotate a planet carrier 122 and a ring gear 105, depending on the relevant operation mode. According to configuration 7A, the planet carrier 122 comprises a one-way bearing 103 along which the planet carrier 122 may rotate with respect to the vehicle chassis 107.

In some embodiments, the configuration of FIG. 7B is equivalent to a differential gear transmission system, as illustrated in FIGS. 6A-6C. Configuration 7B comprises a one-way bearing 603 along which the second side gear 604 may rotate, with respect to the vehicle chassis 607.

Figure 7D:
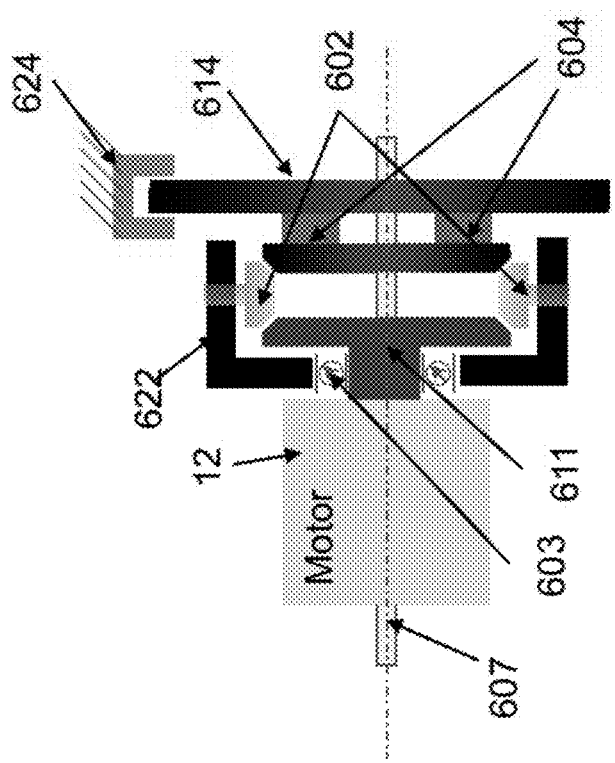
Figure 7C:
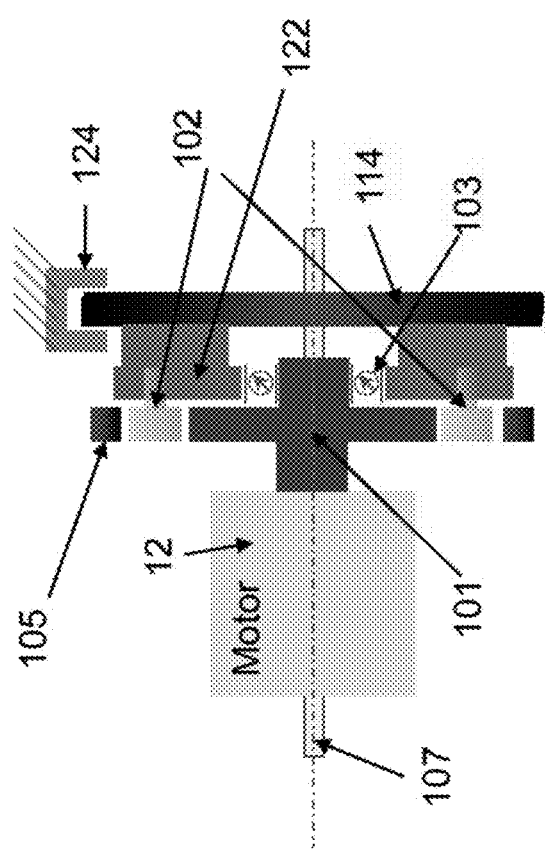

In some embodiments, the configuration of FIG. 7C is equivalent to a planetary gear transmission system, which comprises a planet carrier 122 comprising a one-way bearing 103 along which the planet carrier may rotate with respect to the sun gear 101.

In some embodiments, the configuration of FIG. 7D is equivalent to a differential gear transmission system, which comprises a rack carrier 622 comprising a one-way bearing 603 along which the rack carrier 622 may rotate with respect to the first side gear 611.

Reference is now made to FIG. 8, which is a table summarizing the details of the transmission system configurations of FIGS. 7A-7D, all of which enable driving mode, coasting mode and regenerative braking mode, according to embodiments of the present disclosure. According to some embodiments, table 800 summarizes the characteristics of the different transmission systems of FIGS. 7A-7D that enable driving mode, coasting mode and regenerative braking mode.

According to some embodiments, 'Motor', in table 800, represents the component of the transmission system that is equivalent to the motor, or the component that is directly connected to the motor. 'Final Drive' represents the component of the transmission system that is equivalent to the final drive, or the component that is directly connected to the final drive. 'One-way' represents the component of the transmission system that is forced to rotate in one direction only, during driving mode, and with respect to which other component of the transmission system. 'Braked component' represents the component of the transmission system that is connected to the mechanical braking system and which is forced to reduce its rotational speed when the mechanical braking system is operated.

For example, configuration 'A' in table 800, denotes the transmission system implementing a planetary gear, for example, as illustrated, in FIGS. 7A and 8. In configuration 'A', the component representing and connected to the electric motor 12, is the sun gear 101 (similar to sun gear 501 in FIG. 5A), whose speed is represented by 'Ts'. According to configuration 'A', the component representing the final drive is the ring gear 105 (similar to ring gear 505 in FIG. 5A), whose speed is represented by 'Tr'. According to configuration 'A', the component that is forced to move in one-way only, during driving mode, is the planet carrier 122, (similar to planet carrier 522 in FIG. 5A). According to configuration 'A', the planet carrier 122 is forced to move in one direction with respect to the chassis of the vehicle 107 (similar to chassis 507 in FIG. 5A). Accordingly, the speed of the planet carrier 122 may be equal to or greater than zero 'Tc≥0'. In some embodiments, the one-way direction of the planet carrier 1 may be dictated by a one-way bearing 103 (similar to one-way bearing 503 in FIG. 5A). In some embodiments, the braked component in the planetary gear system of configuration 'A' is the planet carrier 122. Accordingly, the speed of the planet carrier 122 may be reduced to zero (Tc→0), in order to cause rotation of the electric motor 12 for energy regeneration. The control parameters of configuration 'A', which may be implemented by the braking mode control algorithm 400 and equation (3) may be Gear=(−R)/S, and 0<Regen<1.

According to sonic embodiments, configuration 'B' in table 800, denotes the transmission system implementing a differential gear, for example, as illustrated, in FIGS. 7B and 8 and detailed in FIGS. 6A-6C. In configuration 'B', the component representing and connected to the electric motor 12, is the first side gear 611, whose speed is represented by 'T1'. According to configuration the component representing the final drive is the rack carrier 622, whose speed is represented by 'Trc'. According to configuration 'B', the component that is allowed to move in one-way only, during driving mode, is the second side gear 604. According to configuration 'B', the second side gear is forced to move in one direction with respect to the chassis 607 of the vehicle. Accordingly, the speed of the second side gear 604 may be equal to or greater than zero 'T2≥0'. In some embodiments, the one-way direction of the second side gear 604 may be dictated by a one-way bearing 603. In some embodiments, the braked component in the differential gear system of configuration 'B' is the second side gear 604. Accordingly, the speed of the second side gear 604 may be reduced to zero (T2→0), in order to cause rotation of the electric motor 12 via the first side gear 611, for energy regeneration by the electric motor 12.

The control parameters of configuration 'B', which may be implemented by the braking mode control algorithm 400 and equation (4) may be Gear=2, and 0<Regen<1.

According to some embodiments, configuration 'C' of table 800 denotes a transmission system implementing a planetary gear system, which comprises Dual gear ratios, as illustrated in FIGS. 7C and 8. According to configuration 'C', the component of the transmission system that is connected to the motor 12 is the sun gear 101, whereby the sun gear speed is represented by 'Ts'. The component connected to the final drive is the ring gear 105, whose speed is represented by 'Tr'. In configuration 'C', unlike configuration 'A', the one-way bearing 103 is connected to the planet carrier 122, which may rotate along the one-way bearing with respect to the sun 101, as illustrated in FIG. 7C, instead of with respect to chassis 107, as in FIG. 7A. That is, according to configuration 'C', the planet carrier 122, whose speed is represented by 'Tc', is allowed to rotate in one direction only with respect to the sun 101, e.g., via a one-way bearing 103, thereby forcing the condition Tc≥Ts. In configuration 'C', the component connected to the mechanical brake system is the planet carrier 122. Accordingly, the speed of the planet carrier 122 may be reduced to zero (Tc→0), in order to cause rotation of the electric motor 12 for energy regeneration by transferring the torque onto the electric motor 12. The control parameters of configuration 'C', which may be implemented as part of the braking mode control algorithm 400 and equation (3) may be Gear=−R/S, and 0<Regen<1.

According to configuration 'C', during driving mode, due to the one-way-bearing 103, the sun 101 may rotate the planet carrier at a 1:1 ratio, in the same direction, and thus, according to equation (3) the planet carrier 122 may rotate the ring at a 1:1 ratio, in the same direction, i.e., implementing a 1:1 ratio of sun to final drive. For example, according to equation (3), in case the motor 12 or sun 101 rotates at a speed of 200 RPM, then Ts=Tc=Tr=200 RPM.

According to configuration 'C', during coasting mode, the planet carrier 122 is free to rotate. The ring 105 may thus rotate the planet gears 102, and the planet carrier 122 may rotate according to equation (3) thereby enabling the sun 101, and thus the electric motor 12, to rest. As in the example with respect to configuration 7A, in which the number of teeth of the sun gear is 16 and the number of teeth of the ring gear is 64, in the planetary gear implementation, during coasting mode, if the ring speed 'Tr' is 200 RPM, then the planet carrier speed 'Tc' is 160 RPM in order for the sun gear speed 'Ts' to be equal to 0, since the sun gear 101 or electric motor 12 should rest during coasting mode.

According to configuration 'C', during braking mode, the planet carrier 122 is restricted by the fiction brake 114, since the friction brake 114 that is operated during braking mode is connected to the planet carrier 122. Thus, the ring gear 105 may rotate the planet gears 102, which may in turn rotate the sun gear 101 according to equation (3), in the opposite direction of the ring rotation direction, thus not violating the restriction Tc≥Ts imposed by the one-way bearing 103. Causing the sun 101 to rotate by mechanical force instead of by electric power, enables the vehicle to regenerate energy during braking mode. For example, if the ring speed equals 200 RPM (e.g., following coasting), and assuming the speed of the planet carrier 'Tc' equals 16 RPM, then according to equation (3), the motor speed 'Ts' should equal −720 RPM, which is a speed of 720 RPM in a direction opposite the direction along which the ring rotates.

According to configuration 'C', there may be a low gear mode. During low gear mode, the brake may be fully engaged, thereby locking the planet carrier 122 and restricting rotation of the planet carrier 122. The electric motor 12 may supply power in the reverse direction, i.e., a direction opposite the forward driving direction of the ring 105. The planet gears 102 may be rotated by the sun 101, and the planet gears 122 may rotate the ring 105 according to equation (3) in the opposite direction of the sun rotation, i.e., at the direction of forward driving, at a ratio determined by the planetary gear properties. For example, if the ring speed 'Tr' equals 200 RPM, and the planet carrier speed 'Tc' equals 0, then according to equation (3) the speed of the sun gear or speed of the electric motor 'Ts' equals −800 RPM, not violating the restriction Tc≥Ts.

According to some embodiments, configuration 'D' of table 800 denotes a transmission system implementing a semi-regenerative differential gear, illustrated in FIGS. 7D. According to configuration 'D', the component of the transmission system that is connected to the electric motor 12 is the first side gear 611, whose speed is represented by 'T1'. The component connected to the final drive is the rack carrier 622, whose speed is represented by 'Trc'. In configuration 'D', the one-way bearing 603 is connected to the rack carrier 622. That is, according to configuration 'D', the rack carrier 622 is allowed to rotate in one direction only, with respect to the first side gear 611, e.g., via a one-way bearing 103, thereby following the condition Trc≥T1. In configuration 'D', the component connected to the mechanical brake system 114 is the second side gear 604. Accordingly, the speed of the second side gear 604 may be reduced to zero (T2→0), in order to cause rotation of the electric motor 12 via the first side gear 611, for energy regeneration by the electric motor 12 and in this case to also dissipate at least half of the kinetic energy via the mechanical brake, as Regen is defined to be larger than zero and smaller than 0.5.

The control parameters of configuration 'D', which may be implemented by the braking mode control algorithm 400 and equation (4), may be Gear=2, and 0<Regen<0.5.

According to configuration 'D', during driving mode, the electric motor 12 may be operated to power rotation of the first side gear 611. Rotation of the first side gear 611 may force the rack carrier 622 to rotate via the one-way bearing 603 that the rack carrier 622 is connected to, along the allowed direction, at a 1:1 ratio. Rotation of the rack carrier 622 causes rotation of the final drive, thereby enabling movement of the vehicle that the transmission gear of configuration 'D' is implemented within. For example, if the no. of turns of the first side gear 'T1' equals 1, then the no. of turns of the rack carrier 'Trc' also equals 1 due to the 1:1 ratio, and according to equation (4) the no. of turns of the second side gear 'T2' equals 1.

According to configuration 'D', during coasting mode, the rack carrier 622 is free to rotate, which may cause the second side gear 604 to rotate, thereby allowing the first side gear 611 to rest, according to equation (4). For example, the no. of turns of the rack carrier may be the same as in driving mode, e.g., Trc=1. And in order for the no. of turns of the first side gear 'T1' to be equal to 0, i.e., such that first side gear is in rest state, according to equation (4), the no. of turns of the second side gear 'T2' should be equal to 2.

According to configuration 'D', during braking mode, rotation of the second side gear 604 is restricted by the friction brake 614 (and possibly with caliper 624). Since the one-way bearing forces the condition Trc≥T1, it is evident from equation (4) that Trc≤T2. That is, in forward driving condition, braking the second side gear 'T2' to a halt will also halt the rack carrier 'Trc' and the best energy regenerative ratio will be achieved when T1=T2.

Accordingly, the fiction brake will dissipate at least 50% of the energy as indicated by Regen<0.5, since the friction brake can't rotate slower than the electric motor 12. However, on the other hand, the mechanical brake can slow the vehicle that implements a transmission system of configuration 'D', to a complete stop.

It should be noted that according to any of the configurations of transmission systems of the present disclosure, working under load is possible, since the user can disengage the brakes at any time by simply releasing the brake handle or brake pedal.

According to some embodiments, no electrical energy is required for applying the friction brake system. The braking torque may be applied by the user via the brake handle or brake pedal at levels similar to current brake systems.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should he understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

The invention claimed is:

1. A powertrain of a vehicle comprising:
   an electric motor;
   a final drive;
   a gearing system with two-degrees-of-freedom comprising at least three components configured to rotate one with respect to the other, said gearing system configured to transfer power from the electric motor to the final drive,
      wherein said gearing system comprises a one-way mechanism connected to one of the at least three rotating components of the gearing system, said one-away mechanism configured to reduce a degree of freedom of the two-degrees-of-freedom by restricting rotation of the one component along a first direction, during a powered driving mode of the powertrain, while said one-way mechanism is configured to enable free rotation of the one component along a second opposite direction, during coasting mode of the powertrain, thereby avoiding drag of the electric motor; and
   a mechanical friction brake connected to the gearing system via a component of the at least three components, said mechanical friction brake configured to reduce a degree of freedom of the two-degrees-of-freedom by restricting rotation of the component that the mechanical friction brake is connected to, to cause motion of the electric motor, during a braking mode of the powertrain, thereby regenerating energy by the electric motor;
   wherein the gearing system comprises a planetary gear, and the at least three components comprise a sun gear rotatably connected to the electric motor and to at least one planet gear, wherein said at least on planet gear is rotatably connected to a planet carrier; and
   wherein the mechanical friction brake is connected to the planet carrier, said mechanical friction brake is configured to slow rotation of the planet carrier and thus mechanically force rotation of the electric motor via forced rotation of the sun, thereby enabling regenerative braking.

2. The powertrain of claim 1, wherein the mechanical friction brake is connected to the gearing system and is not directly fixedly connected to the final drive.

3. The powertrain of claim 1, wherein the one-way mechanism is an overrunning clutch.

4. The powertrain of claim 1, wherein the one-way mechanism is a one-way bearing incorporated as part of the planet carrier, said one-way hearing is configured to allow the planet carrier to rotate in a first direction and prevent the planet carrier to rotate in a second direction, said second direction being opposite the first direction.

5. The powertrain of claim 1, wherein the mechanical friction brake comprises a disc brake.

6. The powertrain of claim 1, wherein the gearing system comprises a differential gear system, wherein said at least three components comprise a first side gear rotatably connected to the electric motor and to a horizontal planet gear, said horizontal planet gear is rotatably connected to a rack carrier, and wherein said horizontal planet gear is further rotatably connected to a second side gear.

7. The powertrain of claim 6, wherein the one-way mechanism is a one-way bearing incorporated as part of the second side gear, said one-way bearing is configured to allow the second side gear to rotate in a first direction and prevent the second side gear to rotate in a second direction, said second direction being opposite the first direction.

8. The powertrain of claim 6, wherein the mechanical friction brake comprises a disc brake connected to the second side gear, said disc brake is configured to slow rotation of the second side gear and thus mechanically force rotation of the electric motor via forced rotation of the first side gear, thereby enabling regenerative braking.

9. A vehicle gearing system comprising:
an electric motor;
a final drive;
a gearing system with two-degrees-of-freedom comprising at least three components configured to rotate one with respect to the other, said gearing system configured to transfer power from the electric motor to the final drive,
wherein said gearing system comprises a one-way mechanism connected to one of the at least three rotating components of the gearing system, said one-way mechanism configured to reduce a degree of freedom of the two-degrees-of-freedom by restricting rotation of the one component along a first direction, during a powered driving mode of the powertrain, while said one-way mechanism is configured to enable free rotation of the one component along a second opposite direction, during coasting mode of the powertrain, thereby avoiding drag of the electric motor; and
a mechanical friction brake connected to the gearing system via a component of the at least three components, said mechanical friction brake configured to reduce a degree of freedom of the two-degrees-of-freedom by restricting rotation of the component that the mechanical friction brake is connected to, to cause motion of the electric motor, during a braking mode of the powertrain, thereby regenerating energy by the electric motor; and
a control system configured to control an amount of the power supplied by the electric motor during the driving mode, and to control an amount of negative torque applied by the electric motor during the regenerative braking mode, said control system comprising a processor configured to:
detect braking mode;
predefine a set point value based on: (i) transmission ratio of the vehicle and (ii) a parameter modifiable according to a required regeneration ratio, wherein the regeneration ratio represents a ratio between motor speed and final drive speed;
calculate a process value based on an actual ratio between motor speed and final drive speed; and
determine an amount of negative torque required for equality between the process value and the set point value, said negative torque to be applied by the electric motor during the regenerative braking mode;
wherein the gearing system comprises a planetary gear, and the at least three components comprise a sun gear rotatably connected to the electric motor and to at least on planet gear, wherein said at least one planet gear is rotatably connected to a planet carrier, and
wherein the mechanical friction brake is connected to the planet carrier, said mechanical friction brake is configured to slow rotation of the planet carrier and thus mechanical force rotation of the electric motor via forced rotation of the sun, thereby enabling regenerative braking.

10. The vehicle gearing system of claim 9, wherein the required regeneration ratio is determined by at least one of: battery/capacitor state of charge (SOC), power ratings, driving speed, motor load, terrain, temperature, or any combination thereof.

11. The vehicle gearing system of claim 9, wherein the one-way mechanism is a one-way bearing incorporated as part of the planet carrier, said one-way bearing is configured to allow the planet carrier to rotate in a first direction and prevent the planet carrier to rotate in a second direction, said second direction being opposite the first direction.

12. A method for controlling braking mode in a vehicle, said vehicle comprising an electric motor, a final drive, and a gearing system with two-degrees-of-freedom comprising at least three components configured to rotate one with respect to the other, said gearing system configured to transfer power from the electric motor to the final drive,
wherein said gearing system comprises a one-way mechanism connected to one of the at least three rotating components of the gearing system, said one-way mechanism configured to reduce a degree of freedom of the two-degrees-of-freedom by restricting rotation of the one component along a first direction, during a powered driving mode of the powertrain, while said one-way mechanism is configured to enable free rotation of the one component along a second opposite direction, during coasting mode of the powertrain, thereby avoiding drag of the electric motor;
a mechanical friction brake connected to the gearing system via a component of the at least three components, said mechanical friction brake configured to reduce a degree of freedom of the two-degrees-of-freedom by restricting rotation of the component that the mechanical friction brake is connected to, to cause motion of the electric motor, during a braking mode of the powertrain, thereby regenerating energy by the electric motor and a processor;
said method comprising:
detecting braking mode;
predefining a set point value based on: (i) transmission ratio of the vehicle and (ii) a parameter modifiable according to a required regeneration ratio, wherein the regeneration ratio represents a ratio between motor speed and final drive speed;
calculating a process value based on an actual ratio between motor speed and final drive speed; and
determining an amount of negative torque required for equality between the process value and the set point value, said negative torque to be applied by the electric motor during the regenerative braking mode.

13. The method of claim 12, wherein detecting braking mode comprises determining motor spin and further determining no throttle is applied by a user.

14. The method of claim 12, wherein the step of calculating the process value comprises detecting motor speed and detecting final drive speed via respective speed sensors.

15. The method of claim 12, further comprising calculating an error indicating the difference between the process value and the set point value.

16. The method of claim 12, wherein the required regeneration ratio is determined by at least one of: battery/capacitor state of charge (SOC), power ratings, driving speed, motor load, terrain, temperature, or any combination thereof.

* * * * *

UNITED STATES PATENT AND TRADEMARK OFFICE
CERTIFICATE OF CORRECTION

| | | |
|---|---|---|
| PATENT NO. | : 11,801,747 B1 | |
| APPLICATION NO. | : 17/835995 | |
| DATED | : October 31, 2023 | |
| INVENTOR(S) | : Alon Goldman et al. | |

It is certified that error appears in the above-identified patent and that said Letters Patent is hereby corrected as shown below:

In the Drawings

Please replace Fig. 8 with Fig. 8 as shown on the attached page.

Signed and Sealed this
Twelfth Day of March, 2024

*Katherine Kelly Vidal*

Katherine Kelly Vidal
*Director of the United States Patent and Trademark Office*

Alternative configurations

| | Topology | Motor | Final Drive | One-way | Braked component | Control parameters |
|---|---|---|---|---|---|---|
| A | Planetary $(R+S) \times Tc = R \times Tr + Ts \times S$ | Sun $Ts$ | Ring $Tr$ | Planet Carrier Vs Chassis $Tc \geq 0$ | Planet Carrier $Tc \to 0$ | $Gear = -R/S$ $0 < Regen < 1$ |
| B | Differential $Trc = (T1 + T2)/2$ | First side gear $T1$ | Rack Carrier $Trc$ | Second side gear Vs Chassis $T2 \geq 0$ | Second side gear $T2 \to 0$ | $Gear = 2$ $0 < Regen < 1$ |
| C Dual Ratio | Planetary $(R+S) \times Tc = R \times Tr + Ts \times S$ | Sun $Ts$ | Ring $Tr$ | Planet carrier Vs Sun $Tc \geq Ts$ | Planet Carrier $Tc \to 0$ | $Gear = -R/S$ $0 < Regen < 1$ |
| D Semi Regenerative | Differential: $Trc = (T1 + T2)/2$ | First side gear $T1$ | Rack Carrier $Trc$ | Rack Carrier Vs First side gear $Trc \geq T1$ | Second side gear $T2 \to 0$ | $Gear = 2$ $0 < Regen < 0.5$ |

FIG. 8